(12) United States Patent
Gao et al.

(10) Patent No.: US 8,595,174 B2
(45) Date of Patent: Nov. 26, 2013

(54) ANSWER SUPPORT SYSTEM AND METHOD

(75) Inventors: Peng Gao, Beijing (CN); Jie Yang, Beijing (CN); Wei Zhou, Beijing (CN); Qing Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 12/955,772

(22) Filed: Nov. 29, 2010

(65) Prior Publication Data

US 2011/0161274 A1    Jun. 30, 2011

(30) Foreign Application Priority Data

Nov. 30, 2009  (CN) .......................... 2009 1 0247124

(51) Int. Cl.
*G06N 5/02* (2006.01)

(52) U.S. Cl.
CPC ..................................... *G06N 5/022* (2013.01)
USPC .......................................................... 706/50

(58) Field of Classification Search
USPC .......................................................... 706/50
See application file for complete search history.

(56) References Cited

U.S. PATENT DOCUMENTS

| | | | |
|---|---|---|---|
| 4,885,705 A * | 12/1989 | Choi | 702/184 |
| 6,782,391 B1 | 8/2004 | Scher | |
| 6,826,745 B2 | 11/2004 | Coker et al. | |
| 7,788,536 B1 * | 8/2010 | Qureshi et al. | 714/38.14 |
| 7,941,136 B2 * | 5/2011 | Reed et al. | 455/424 |
| 8,001,527 B1 * | 8/2011 | Qureshi et al. | 717/120 |
| 8,271,402 B2 * | 9/2012 | Fisher, Jr. | 706/12 |
| 2002/0026435 A1 | 2/2002 | Wyss et al. | |
| 2004/0111301 A1 | 6/2004 | Wahlbin et al. | |
| 2006/0095273 A1 | 5/2006 | Montvay et al. | |
| 2006/0106791 A1 | 5/2006 | Morrow et al. | |
| 2006/0106796 A1 * | 5/2006 | Venkataraman et al. | 707/6 |
| 2009/0075648 A1 * | 3/2009 | Reed et al. | 455/424 |
| 2010/0324927 A1 * | 12/2010 | Tinsley | 705/2 |

FOREIGN PATENT DOCUMENTS

WO    WO 02/25627 A1    3/2002

OTHER PUBLICATIONS

Peter J. Haas, Fabian Hueske, and Volker Markl, "Detecting Attribute Dependencies from Query Feedback." In Christoph Koch, et al. editors, Proceedings of the 33rd International Conference on Very Large Data Bases, University of Vienna, Austria, Sep. 23-27, 2007, pp. 830-841, ACM, 2007.*
Timothy L. Acorn; "SMART: Support Management Automated Reasoning Technology for Compaq Customer Service"; paper from 1992 IAAI-92 Proceedings, Association for the Advancement of Artificial Intelligence (AAAI); 1992.
W. Lewis Johnson et al.; "Interactive Explanation of Software Systems"; paper submitted to the 10th Knowledge-Based Software Engineering Conference (KBSE-95); 1995.
Rahimov M. Zahedi; "Abstract: A Two-Level Automatic Help Desk Based on a New Statistical Approach"; paper from Third Int'l Conf. on Internet and Web Applications; 2008.

* cited by examiner

*Primary Examiner* — Kakali Chaki
*Assistant Examiner* — Fuming Wu
(74) *Attorney, Agent, or Firm* — Brevetto Law Group

(57) ABSTRACT

An answer support system generates a target cause to aid in solving a current problem. Upon receiving known problem symptoms of the current problem from the customer, a search of problem causes is conducted in a knowledge database to find potential causes corresponding to the known problem symptoms. If conventional techniques cannot determine the target cause of the current problem, an attribute is selected which is not among the attributes associated with the known problem symptoms in the database. The attribute selection is based on the attribute deemed most likely to identify the target cause of the current problem from among the potential causes found in the knowledge database.

24 Claims, 7 Drawing Sheets

|  | Attribute 1 | | Attribute | Attribute k | | Attribute t | | |
|---|---|---|---|---|---|---|---|---|
|  | $V_1$ | $V_2$ | ... | $V_j$ | ... | $V_{n-1}$ | $V_n$ | $SUM_C$ |
| $C_1$ | $T_{11}$ | $T_{12}$ |  | $T_{1j}$ |  | $T_{1,n-1}$ | $T_{1,n}$ | $RC_1$ |
| $C_2$ | $T_{21}$ | $T_{22}$ |  | $T_{2j}$ |  | $T_{2,n-1}$ | $T_{2,n}$ | $RC_2$ |
| $C_3$ | $T_{31}$ | $T_{32}$ |  | $T_{3j}$ |  | $T_{3,n-1}$ | $T_{3,n}$ | $RC_3$ |
| ... |  |  |  |  |  |  |  | ... |
| $C_i$ | $T_{i1}$ | $T_{i2}$ |  | $T_{ij}$ |  | $T_{i,n-1}$ | $T_{i,n}$ | $RC_i$ |
| ... |  |  |  |  |  |  |  | ... |
| $C_m$ | $T_{m1}$ | $T_{m2}$ |  | $T_{mj}$ |  | $T_{m,n-1}$ | $T_{m,n}$ | $RC_m$ |
| $SUM_s$ | $RV_1$ | $RV_2$ |  | $RV_j$ |  | $RV_N$ |  | R |

ANSWER SUPPORT SYSTEM AND METHOD

CROSS-REFERENCE TO RELATED APPLICATIONS

The present application claims priority from, and incorporates by reference in its entirety, Chinese patent application 200910247124.9 filed on Nov. 30, 2009.

BACKGROUND

1. Technical Field

Various embodiments of the present invention relate to computer support services, and more particularly, to an answer support system to provide customer service support.

2. Description of Related Art

As computer and software products become increasingly complex many organizations have established customer support departments to solve problems and answer questions about their products and services. The customer support department strives to collect information from the customer, quickly determine the nature of a customer's problem, and communicate a solution to the customer. The efficiency of the customer support department depends largely on the skills and experiences of the first line support staff. However, the junior support staff directly interfacing with customers must typically spend considerable time honing their skills and gaining experience before they can provide satisfactory technical support.

FIG. 1 depicts a typical customer support process of a software enterprise. In step 103, first line support staff collect information related to the question by means of, for example, calling the customer. The collected information typically includes the type of problem the customer has encountered, in what environment the software product in running, what is seen by the customer, what is reported in the log, what changes are made before the problem happens, and other such information. The method proceeds to 105 where the first line support staff analyzes the collected information. In step 107 the first line support staff determines whether the collected information is enough for determining the cause of the problem. If more information needs to be collected the method proceeds to step 109 and the first-line support staff collect more information by conversing with the customer. But if the collected information is sufficient the method proceeds to step 111.

If, in step 111, the first-line support staff determines that they cannot answer the customer's question the method proceeds to step 113 to transfer the problem to second line senior staff for a solution. However, if first-line support staff is able to answer the customer's question then the method proceeds to step 115. In step 115, the first-line support staff forms a solution, and then provides the solution to the customer in step 117. If it is determined in step 119 that the problem is not solved the method proceeds back to block 107 to collect further information. However, if step 119 determines that the problem has been solved the method proceeds to 121 and the process ends.

One problem with this conventional method is that the senior technical staff who have gained the requisite experience and skills often find it tedious to repeat such processes day after day. This often results in attrition of the senior technical staff to other, more challenging jobs. As the senior support staff leaves the customer support department over time, the enterprise loses their valuable insights and experiences.

Automated assistant tools have been proposed in an attempt to assist support staff work. For example, U.S. patent application US20060078862 presents an answer support system which stores and uses past query cases to automatically provide proper answers to a customer's questions. However, since this system relies on information provided by the customer its effectiveness is limited by the customer's ability to describe the problem.

BRIEF SUMMARY

Various embodiments of disclosed herein involve methods and systems for generating a target cause in an answer support system to aid in solving a current problem. The known problem symptoms are described by a customer, for example, during a telephone call with a help center technician. The known problem symptoms compared to descriptions of problem symptoms stored in knowledge database, each of the problem systems having being associated with one or more problem causes. Once the knowledge database has been searched to find a potentially matching causes corresponding to the known problem symptoms, the system attempts to determine a target cause of the current problem from among the various potential causes found during the search. If the system is unable to determine a target cause of the current problem, the system chooses as a selected attribute an attribute which is not among the attributes associated with the known problem symptoms. The attribute value used for this is determined to be the attribute most likely to identify a target cause of the current problem. Once the attribute has been selected the system determines the target cause based on the selected attribute and generates a solution based on the target cause.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIG. 3 depicts a typical structure of a knowledge database in an answer support system according an embodiment disclosed herein;

DETAILED DESCRIPTION

Figure 1:
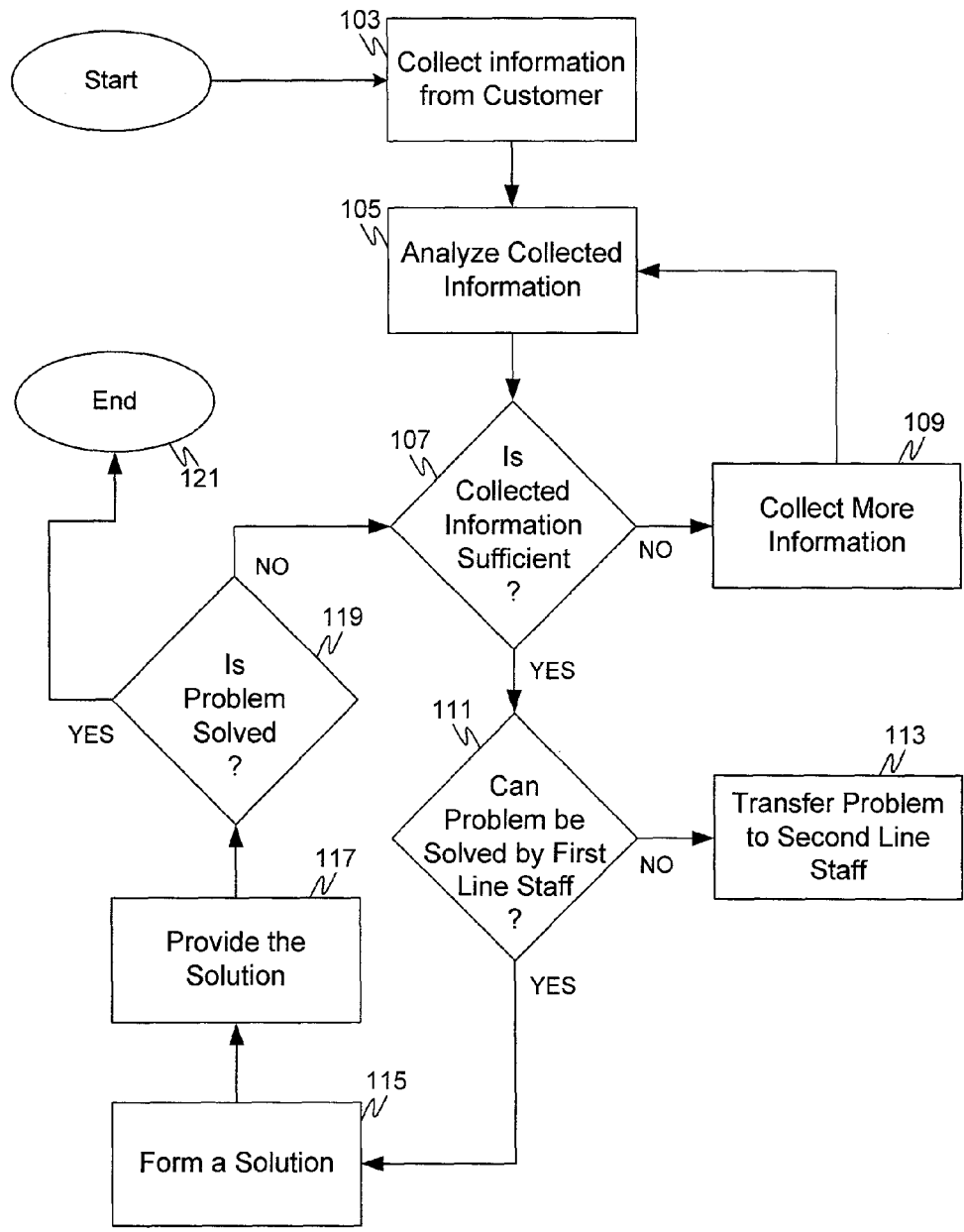
FIG. 1 depicts a typical customer support process of a software enterprise.

Various embodiments disclosed herein provide an answer support system that includes a knowledge database containing historical data on mapping relationships between problem causes and a set of problem symptoms. The problem symptoms may be represented as attribute values stored in the knowledge database. This allows the knowledge database to be searched on the basis of one or more problem symptoms communicated by a customer. A search of the knowledge database may uncover several potential causes corresponding to the problem symptoms. The underlying cause of the current problem may be determined by comparing the historical data of the various potential causes with respect to the known problem symptoms in the knowledge database.

The potential cause of the problem can be selected based on an attribute value in the knowledge database deemed most likely to be able to determine the target cause of the problem from other potential causes. Questions may be generated for the customer based on the selected attribute. The answer to a question may result in a new known problem symptom. The interaction between questions, customer answers and the historical database is an iterative operation until a target cause of the current problem is determined, or the attribute values of all the remaining attributes have been determined and the target cause of the current problem can still not be determined.

Another aspect of the system involves an answer support method based on the knowledge database with historical data and mapped relationships between problem causes and problem symptoms. The problem symptoms may be represented as attribute values in the knowledge database. Upon receiving one or more known problem symptoms the knowledge database can be searched to find potential causes of the problem symptoms. If multiple potential causes result, the target cause of the current problem can be determined according to the difference between the historical data of the multiple potential causes and the known problem symptoms in the knowledge database. If a target cause cannot be determined, an attribute may be selected by using the attribute value (besides the attributes to which the known problem symptoms belong) most likely to be able to determine the target cause of the current problem from the multiple potential causes. One or more customer questions may be generated, depending upon the selected attribute. Upon receiving answers to the questions, a new known problem symptom may be selected as the attribute value. Typically, the question/answer/attribute selection steps are performed iteratively until a target cause of the problem is determined.

By using the answer support system disclosed herein, the first line support staff does not need to solely rely on their own skills or experiences. They may instead use the answer support system of the present application to determine the cause of a customer's problem and provide a solution. This speeds up the solving process of problem solving and enhances customer satisfaction. Moreover, junior first line support staff may use the system to improve their skills quickly while providing support services to customers, because the system stores structural knowledge about the associations between various causes and problem symptoms based on past cases and senior technical staff's experiences. Therefore, the system aids in support staff training. For senior technical staff, the system will free them from the tedious work of answering calls and customer problems, enabling them to focus on studying more complex problems and adding study results into the system. In this way, the system will be able to solve an increasing variety of problems the longer it is used. Of course, the senior technical staff can also use the system to find out known solutions to problems without need to perform repeated analysis, so as to improve the efficiency of the study.

Figure 2:
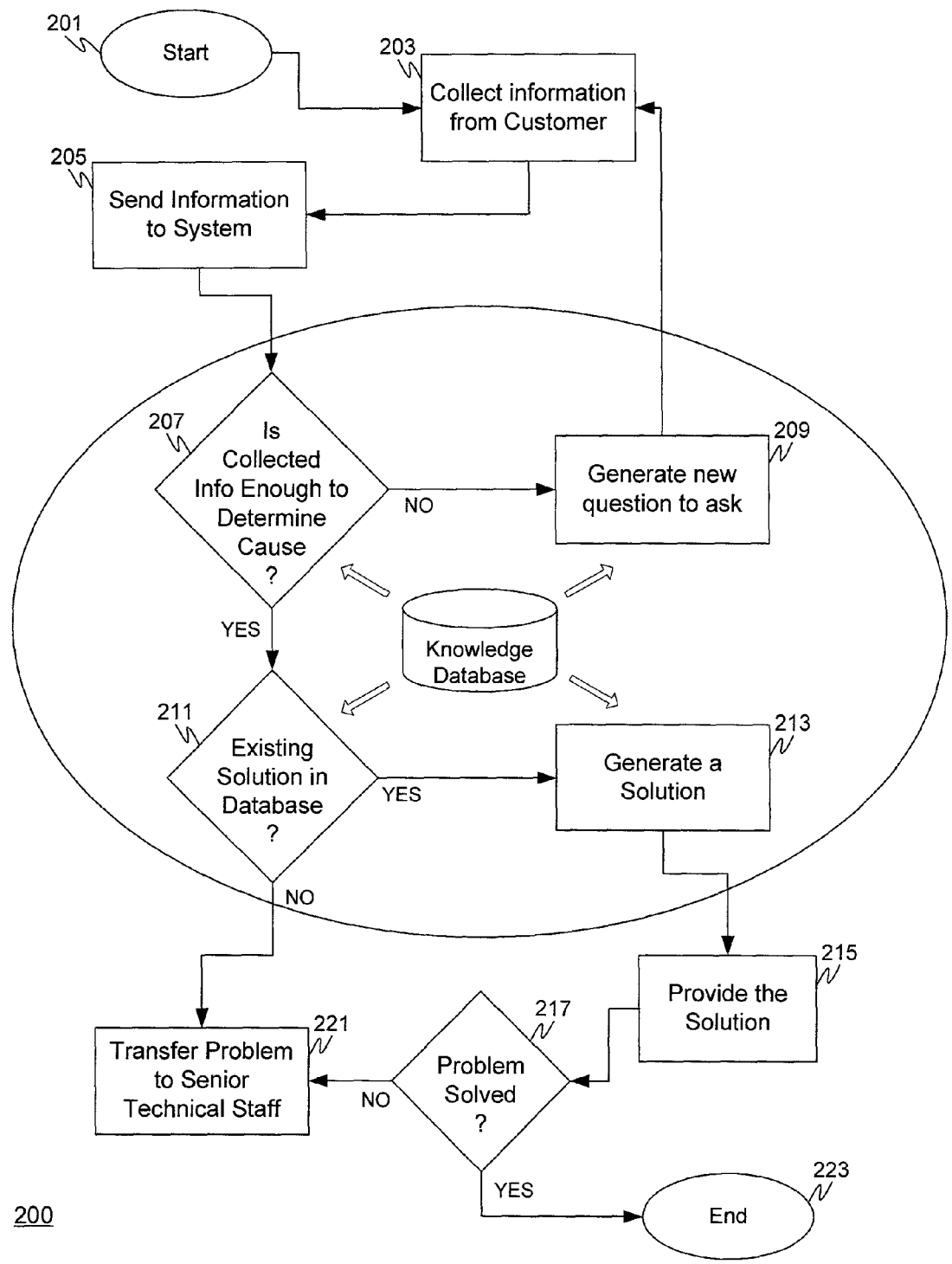
FIG. 2 is a flow chart of a method for using an answer support system according to an embodiment disclosed herein.

FIG. 2 is a flow chart 200 of a method for using an answer support system according to an embodiment disclosed herein. The answer support system according to various embodiments stores a cause-symptom two-dimensional table (or called matrix) about customer cases in a knowledge database. According to the symptoms obtained from the question descriptions collected from the user, various embodiments of the answer support system automatically generate a dynamic question list for the customer through use of the two-dimensional table. The questions and orders in the list are interdependent and dynamic. That is, they depend on the cause/symptom associations in the two-dimensional table as well as the customer's initial question descriptions and answers to previous questions.

The answer support system may be used to provide assistance and support for the first line support staff by generating questions for the first line support staff to ask the customer. Based on the customer's answers the answer support system may determine the cause of the customer's problem and generate a solution script to solve the customer's problem. This frees up the senior technical staff to focus on studying problems for which there is no solution in the knowledge database. The solutions of the senior technical staff may then be stored in the knowledge database for future use, and to enhance the capabilities of the answer support system.

Turning to FIG. 2, this figure depicts a process for using the answer support system according to various embodiments to provide customer support. The method begins at 201 and proceeds to 203 to collect information about the problem from the customer. This may be done, for example, by a first line support technician speaking with a customer via telephone, e.g., on a help line. Alternatively, the customer may be communicating with the support technician in a chat room, by instant messaging, or via any other like means of communication known to those of ordinary skill in the art. As shown in the figure, after the support staff collects information related to the problem from the customer in 203, the method proceeds to 205 and the collected information is sent to the answer support system. In a typical implantation the support technician is logged into a computer system which is either running the answer support system, or is communicating with it via a network such as a local area network (LAN), the Internet, or other such lines of communication. Upon sending the information to the answer support system in 205 the method proceeds to block 207.

In 207 of FIG. 2 the answer support system determines whether the collected information is adequate for determining the cause of the customer's problem. The information typically includes identifying information (e.g., model number of hardware, release and revision number of software, serial number, or the like) and information about the symptoms/description of the problem (e.g., computer won't boot up properly, no Internet access, computer crashes in a given situation, or the like). It may be the case that the information received is useful, but the system needs to gather more information to narrow down the possible solutions. If there is not enough information to arrive at a solution for the customer's problem the method proceeds from 207 along the "NO" path to 209. In block 209 a new question for the customer is generated and provided to the support staff. The method then proceeds back to 203 so that the support staff can ask the newly generated question and collect further information. Returning to block 207, if the collected information is judged to be sufficient for determining the cause of the customer's problem then the method proceeds from 207 along the "YES" path to 211.

In block 211 determines whether the knowledge database contains a suitable solution for the customer's problem. This may be done, for example, by a keyword search of the provided information. Generally, it won't be known whether or not the proposed solution fixes the problem until the customer actual tries it. However, based on the information from the customer, attributes and description of the problem, the answer support system determine can determine whether a suitable solution exists in the knowledge database that is likely to fix the customer's problem. If it is determined in block 211 that the knowledge database does not contain a suitable solution for the customer's problem then the method proceeds from 211 along the "NO" path to 221 to transfer the problem to a member of the senior technical staff. However, if it is determined in 211 that there is an existing solution, the method proceeds from 211 along the "YES" path to 213. The solution is generated in step 213. This may entail putting together instructions for the customer to implement the solution, or a script to help the support staff technician explain the solution to the customer.

The method then proceeds to 215 and the solution is provided to the customer. In many instances the junior support technician explains the solution to customer over the phone. However, in other situations the solution may be communicated by other means, e.g., written instructions in an email, a chat room, instant messaging, or the like. Once the solution has been provided to the customer in 215 the method proceeds to 217. In block 217 it is determined whether the problem has been solved by receiving the customer's feedback. If it is determined in 217 that there is no existing solution in the knowledge database, or it is determined in 217 that the problem has not been solved, then the method proceeds from 217 along to "NO" path and the system may transfer the problem to a second line senior technical staff. In some embodiments, a failed attempt to solve the problem in 217 may result in further iterations with the junior support technician, returning to block 203 one or more additional times to gather more information and attempt to solve the problem.

Once it is determined that the junior support technician cannot readily solve the problem the method proceeds from 217 along the "NO" path to 221 to transfer the problem to a second line senior technical staff member. If, in block 221, the second line senior technical staff member determines a solution to the problem by study then the newly discovered solution to the problem—that is, the association between the cause and the symptoms—may be stored in the knowledge database for future use. If the problem has been solved, the result is stored in the knowledge database, and the process ends. Following will be described in greater detail the workflow of the answer support system according to various embodiments by referring to the accompanying drawings.

FIG. 3 depicts a typical structure of a knowledge database in an answer support system according to various embodiments disclosed herein. As shown, the overall structure of the knowledge database is a two-dimensional matrix which represents historical data on mapping relationships between causes and symptoms. A "cause" refers to the root of a problem. Once the cause of a problem is determined, the solution to the problem can be determined. "Symptoms" refer to a series of indications of a problem. Symptoms can be divided into categories, each called an attribute. A symptom may be characterized as an attribute value. Each attribute may have a plurality of attribute values.

In the knowledge database of FIG. 3, $C_i$ denotes a cause, where i=1 . . . m. Attribute k denotes an attribute, where k=1 . . . t. The attributes are typically discrete and non-overlapping numerical values, or other searchable alphanumeric values. $V_j$ denotes a symptom, e.g., an attribute value, where j=1 . . . n. Different attribute values of a same attribute are discrete and non-overlapping. $T_{ij}$ denotes a number value of the cause $C_i$ for the symptom $V_j$. $RC_i$ denotes the sum of the number values of the cause $C_i$ for all the symptoms, that is, the sum of all $T_{ij}$ in row $C_i$. $RV_j$ denotes a sum of number values of all the causes for the symptom $V_j$, that is, the sum of all $T_{ij}$ in column $V_j$. R denotes the sum of all the $RC_i$.

If the customer support call concerns a software product the attributes may include: the platform(s) used by users, the time when machines break down, versions of the software product, or other such characteristics of the software and the computers running the software. The causes may be various specific causes of problems. For example, take IBM Tivoli Integrated Portal as an example, exemplary segments of its knowledge database can be illustrated in the following table:

|  | Platforms | | | Versions | | Cannot log in | | |
|---|---|---|---|---|---|---|---|---|
|  | | | | | | Password | Button | Total |
| Causes | Windows | Linux | ... | Tip1.1 | Tip1.2 | incorrect | disabled | sum |
| C105:isclite.jar damaged | 123 | 345 | | 125 | 231 | 0 | 231 | 1399 |

The initial data in the knowledge database can be entered either by first line support staff, by senior technical staff, or other staff, according to historical data about the customer problems. The system will automatically update the data in the knowledge database during the running process of an answer support system, according to various embodiments. Senior technical staff can also enter corresponding causes and symptoms data into the knowledge database according to their own study results on customer's problem. In addition, the senior technical staff can also carry out various maintenances on the knowledge database, e.g., tidying data in the knowledge base, adding and/or removing attributes and attribute values to/from the knowledge database, or other like maintenance activities for the knowledge database.

Turning again to FIG. 2, in block 203 the first-line support staff may obtain a symptom description of the problem from the customer, and based on the symptom description, generate a known symptom vector. Typically, each element value in the known symptom vector corresponds to an attribute value in the knowledge database. For example, from the symptom description, "on the Windows platform, Tip 1.2 is successfully installed, but cannot be logged in", a symptom vector (windows XP platform, Tip 1.2, button is disabled) may be generated. If the symptom description includes a symptom not corresponding to any of the attribute values in the knowledge database, then the symptom does not belong to any of the attributes. In such cases the first-line support staff may send the symptom and related information to senior support staff for them to decide whether to add the attribute value corresponding to the symptom to the knowledge database.

In block 205 of FIG. 2 the first-line support staff may transmit the generated known symptoms vector to the answer support system. In blocks 207-213 the answer support system may perform a number of sub-operations involving searching the knowledge database. For example, 207 may entail searching the knowledge database according to the known symptoms vector, and for each row in the knowledge database, if the number values corresponding to the respective symptoms in the symptoms vector are all null or zero (which means, in history there is no evidence to prove that the cause has occurred in any one of the known symptoms), the row is deleted; and if in the row, at least one of the number values corresponding to the respective symptoms in the symptoms vector is neither null nor zero, the row is kept, thus generating a sub-matrix. Next, in the sub-matrix, columns of other attribute values in the attributes to which the symptoms in the symptoms vector belong are deleted. That is, the rows in the generated sub-matrix are all the rows in the original matrix which include at least one number value corresponding to the symptoms in the symptoms vector, and the columns in the generated sub-matrix are columns of attribute values in the original matrix corresponding to the symptoms in the symptoms vector and columns of the attribute values of all the remaining attributes. In addition, sums of the rows and columns may be re-generated. Next, some embodiments may determine whether the number of rows included in the generated sub-matrix is smaller than 2. If it is determined that the number of rows included in the generated sub-matrix is smaller than 2, i.e., the obtained number of causes is smaller than 2, then the method proceeds to block 211.

In 211 it is further determined whether the generated sub-matrix is null. If it is determined that the sub-matrix is null—that is, the number of rows included is zero, indicating that a cause cannot be found according to the symptoms vector—then the method proceeds to 221. In block 221 information related to the problem, such as the symptoms vector, is sent to senior technical staff for them to process, e.g., obtaining the corresponding cause by studying the problem and entering the cause and the related symptoms into the knowledge database for solving future problems. Returning to block 211, if it is determined in 211 that the sub-matrix is not null (e.g., the number of the rows included is 1 indicating that the cause has been found according to the symptoms vector), then the method proceeds to 213. In block 213 a solution is generated corresponding to the cause, and in step 215 the solution is provided to the customer by the first-line support staff.

In the case that the generated sub-matrix only includes one row, the first-line support staff can also further determine whether the number values of the known symptoms in the row are all greater than or equal to 1, and can further ask the customer one or more questions (e.g., in block 209) for other attributes than the known symptoms in the row, find the number values in the corresponding other attribute values in the row through the symptoms included in the answer by the customer. The first-line staff member can may then be able to determine whether the obtained cause is correct according to the number values (e.g., if all the number values are greater than or equal to 1, it can be determined the cause is correct). If it is determined the obtained cause is correct, a solution corresponding to the cause is generated and provided to the customer by the first-line support staff in steps 213 and 215. Otherwise, the method proceeds to block 221 and the information related to the problem (e.g., the symptoms vector) can be transferred to senior technical staff for processing. The senior technical staff member may be able to determine the corresponding cause by studying the problem and entering the cause and the related symptoms into the knowledge database for solving future problems.

Returning to block 207, if it is determined in 207 that the number of rows in the generated sub-matrix is greater than or equal to 2, then the method proceeds along the "NO" path to 209 to generate questions to ask to the customer. Step 209 generates a dynamic question set based on a modified ID3 algorithm to extend the symptoms vector iteratively, so as to find out the cause of the problems as soon as possible. As such, the generated questions are based on answers received from the customer in order to arrive at the cause of the problems as soon as possible. The traditional ID3 algorithm is used for constructing a decision tree based on a set of examples, each of which includes attribute values of a number of attributes and a target attribute value or classification. The algorithm determines the sequence for examining the attributes by calculating an entropy-based information gain of each attribute and sorting the attributes according to the magnitude of their information gains, so as to construct the decision tree, wherein the root node and intermediate nodes of the decision tree denote the respective attributes, the branches denote attribute values, and the leaves denote the target attribute values or target classification. The constructed decision tree may be used to determine the target attribute value or target classification of the current example with respect to the various attribute values of the current example.

Although the traditional ID3 algorithm can be used to determine the target attribute value or target classification of the current example according to its attribute values, since it uses the same decision tree and the same attribute value sequence to calculate its target attribute value for any current example, it is not suitable for quickly finding out target attribute value or target classification of the current example in complex scenarios, such as technical support of software products or the like, where there are too many target attribute values or target classifications as well as too many attributes.

Various embodiments disclosed herein may use the idea of selecting an attribute according to the information gains of different attributes from the traditional ID3 algorithm to form the modified ID3 algorithm for the various embodiments. The modified ID3 algorithm may include the following iterative steps:

In the first step, a target cause is determined. First, for each cause row in the sub-matrix generated in step 3, a known information effective ratio thereof is calculated: for each cause row, the corresponding number values of the symptoms in the known symptoms vector are summed, and then divided by the total sum of the row. For the ith cause row in the sub-matrix, the calculation formula of its known information effective ratio is as follows:

$$\frac{\sum_{V_{k_i} \in Attribute} T_{ij}}{RC'_i} \quad \text{Formula (1)}$$

wherein $V_{k_i}$ denotes the attribute values in the sub-matrix, Attribute denotes the known symptoms vector, $T_{ij}$ denotes the respective number values in the ith cause row in the sub-matrix, and $RC'_i$ denotes the number value of the last column of the ith cause row in the sub-matrix, which equals the sum of all the number values in the ith cause row in the sub-matrix.

Secondly, the cause rows are sorted in descending order according to their known information effective ratios, and the cause with the maximum known information effective ratio is taken as a temporary target cause, while all the remaining causes are taken as secondary causes. The known information effective ratio of a cause row may be thought of as the possibility that the cause is the target cause for generating the symptoms in the currently known information.

If the difference between the known information effective ratio of the temporary target cause and that of the second cause with the maximum information ratio is greater than a threshold, the temporary target cause is determined as the target cause, and the iteration ends. The threshold can be determined in advance, and can be, for example, the average value of the differences between every two adjacent causes in the above causes sorted in descending order.

In the second step, for the temporary target cause, the maximum distinctive attribute is determined as a question to be asked to the customer. The maximum distinctive attribute refers to the attribute that can best differentiate the temporary target cause from other causes, that is, the attribute that can most probably make the difference between the known information ratio of the cause and that of the other causes greater than the threshold. This step may comprise the following sub-steps:

First, all the remaining attributes besides the attributes to which the known symptoms belong are traversed. For each of the remaining attributes, we define the number of positive examples: the sum of the number values of all the symptoms (attribute values) of the remaining attribute of the temporary target cause, and its formula is as follows:

$$P_\oplus = \sum_{V_{k_s} \in remainingAttribute(t)} T_{ij} \quad \text{Formula (2)}$$

wherein $P_\oplus$ denotes the positive examples of the remaining attribute t, $V_{k_s}$ denotes each of the attribute values of the remaining attribute, remainingAttribute(t) denotes the remaining attribute t, and $T_{ij}$ denotes the number value of the temporary target cause with respect to each symptom of the remaining attribute.

Number of negative examples: The sum of the number values of all the symptoms (attribute values) of the remaining attribute of all the secondary causes, and its formula is as follows:

$$P_\ominus = \sum_{secondaryCauses V_{k_s}} \sum_{\in remainingAttribute(t)} T_{ij} \quad \text{Formula (3)}$$

wherein $P_\ominus$ denotes the negative examples of the remaining attribute t, $V_{k_s}$ denotes each of the attribute values of the remaining attribute, remainingAttribute(t) denotes the remaining attribute t, and $T_{ij}$ denotes the number value of each of the causes with respect to each symptom of the remaining attribute.

Next, the entropy value of each of the remaining attribute is calculated according to the number of positive examples and the number of negative examples in each of the remaining attributes, and its formula may be as follows:

$$\text{Entropy}(A_i) = -\frac{p_\oplus}{p_\oplus + p_\ominus}\log_2\frac{p_\oplus}{p_\oplus + p_\ominus} - \frac{p_\ominus}{p_\oplus + p_\ominus}\log_2\frac{p_\ominus}{p_\oplus + p_\ominus} \quad \text{Formula (4)}$$

Then, the information gain of each remaining attribute is calculated according to the entropy value of the remaining attribute, and its formula may be as follows:

$$\text{Gain}(A_i) = \text{Entropy}(A_i) - \sum_{v \in remainingAttribute} \frac{|S_v|}{|S|}\text{Entropy}(S_v) \quad \text{Formula (5)}$$

wherein Gain ($A_i$) denotes the information gain of the attribute $A_i$, Entropy ($A_i$) denotes the entropy value of the attribute Ai, and v traverses every attribute in the remaining attributes; Entropy ($S_v$) denotes the entropy value of a specific remaining attribute, $|S_v|$ denotes the sum of the numbers of the positive examples and negative examples of the specific attribute value, and $|S|$ denotes the sum of the numbers of the positive examples and negative examples of all the remaining attributes.

Finally, the remaining attribute with the maximum information gain among all the remaining attributes is selected as the maximum distinctive attribute, which is sent to the customer by the first-line support staff as a further question.

After receiving the answer to the question from the customer, the first-line support staff may extract the attribute value contained in the answer and attach the attribute value to the above known symptoms vector to form an extended known symptom vector. Then, the above steps may be performed iteratively on the extended known symptoms vector. That is, the extended known symptoms vector is sent to the answer support system according to an various embodiments disclosed herein, and the answer support system searches in the knowledge database according to the extended known symptoms vector to form a new sub-matrix, determines the temporary target cause and secondary causes by calculating the known information ratio of each cause row in the sub-matrix, determines whether the difference between the known information ratio of the temporary target cause and those of the maximum secondary causes is greater than the threshold. If it is greater than the threshold, the system ends the iteration, determines the temporary target cause as the unique target cause, generates a corresponding solution and provides it to the customer by the first-line support staff. If the known information ratio is smaller than or equal to the threshold, the system determines a new maximum distinctive attribute by calculating the information gain of each of the remaining attributes as a further question to be asked to the customer. The above process may be performed iteratively until a unique target cause is obtained, or all the remaining attributes have been asked as questions and a unique target cause can still not be obtained.

Returning to FIG. 2, in the case that a unique target cause has been obtained, a corresponding a solution can be generated based on the target cause in block 213. The solution can then be provided to the first-line support staff in block 215 of FIG. 2, for the first-line support staff to send it to the customer.

One example format of the generated solution including the unique target cause may be as follows:

Dear supporter No. \*\*\*:

Below is the probable result:

The customer has given enough information, and the symptoms vector matching the knowledge database is:

(\*\*\*\*\*,\*\*\*\*\*,\*\*\*\*\*,\*\*\*\*\*)

We have found that the Cause Number (\*\*\*\*\*): (symptom name) platform parameter is not correct, matching with the symptoms vector, Its solution is:
configure the platform parameter *** and reboot the machine
The most probable symptoms are **,  and **
Please do an experiment in advance to ensure the analysis is correct. Thank you!

The method proceeds to block 217 where the first-line support staff may ask the customer whether the customer's problem has been solved. If it is determined in block 217 that the customer's problem has been solved, the first-line support staff may update the knowledge database accordingly, e.g., adding the number value of the cause with respect to each known symptom by 1. However, if it is determined in block 217 that the customer's problem has not yet been solved, then the method may proceed from 217 along the "NO" path to 221 where it may be provided to senior support staff for study.

When a unique target cause cannot be obtained, a solution including all the obtained causes can be generated and provided to the first-line support staff. Preferably, the probability of each of the causes is also included in the solution. The probability of a cause can be calculated in the following manner: In the finally-formed sub-matrix, calculating the sum of the number values of each cause with respect to all the known symptoms; adding the sums of the value numbers of all the causes to obtain the total sum of the number values; dividing the sum of the value numbers of each cause by the total sum of the number values, and taking the quotient as the probability of the cause. For example, for a sub-matrix, the formula of the probability of the cause i can be as follows:

$$\frac{RC_i'}{R} \qquad \text{Formula (6)}$$

wherein, $RC_i'$ is the sum of all the number values in the row where the cause i is in the sub-matrix, that is, the sum of the number values of the cause with respect to the known problem symptoms. R is the total sum of all the number values of all the cause rows in the sub-matrix, that is, the sum of the number values of all the causes with respect to the known problem symptoms.

The first-line support staff may send the solution including the plurality of possible problem causes to the customer, so that the customers can determine a cause therein by experiments. Of course, the first-line support staff can also send the solution to senior technical staff and ask the senior technical staff to study each cause and the symptoms thereof to determine a unique target cause, and then generate a solution according to the determined unique target cause and provide the solution to the customer.

Similarly, the first-line support staff asks the customer whether the customer's problem has been solved. If it has been solved, the first-line support staff may update the knowledge database accordingly, for example, by adding the number values of the target cause with respect to each known symptom by 1. If the customer problem has not been solved, then the customer's problem may be provided to senior technical staff for study.

If it is found that a unique target cause cannot be obtained, it may be because the plurality of the obtained causes may not be independent from each other. That is, there may be dependency between the causes. To this end, according to various embodiments the dependency between the causes may be further determined and calculated, and the dependency information may be included in the solution provided to the first-line support staff. The dependency between causes may be calculated by the following Chi-square analysis:

First, a Chi-square value between the causes is calculated by the following equation:

$$\chi^2 = n\left(\sum_{i=1}^{r}\sum_{j=1}^{c}\frac{T_{ij}^2}{RC_i RV_j} - 1\right) \qquad \text{Formula (7)}$$

wherein, $\chi^2$ denotes the chi-square value, r denotes the number of rows in the sub-matrix including a plurality of causes, c denotes the number of columns in the sub-matrix, and $T_{ij}$ denotes the number value of the ith row and jth column, $RC_i$ denotes the sum of number values of the ith row, $RV_j$ denotes the sum of number values of the jth column, and n denotes the total number of elements, e.g., r×c.

Next, against the chi-square table well-known in the art, a corresponding row in the chi-square table is looked up by a degree of freedom (r−1)×(c−1), and the column to which the chi-square value belongs in the row is determined, so that the probability of the dependency between the causes is obtained.

After the first-line support staff has determined that there is dependency between the causes by their own study or by asking for the senior technical staff to study, they can merge mutually-dependent causes into a single cause in the knowledge database. One example format of a generated solution indicating that there is no dependency between the causes can be as follows:

Dear supporter No ***,
We have helped you to check cause 1, cause 2, . . . cause n. We found that there is more than a 99.9% probability that they are mutually independent.
Below are the probable causes and their probabilities:
Cause 1: *** probability;
Cause 2: *** probability;
Cause 3: *** probability;
Please check the causes and add the relevant data of the cause checked to be correct into the knowledge database.

Only as an example, the format of the generated solution indicating there is dependency between the causes can be as follows:

Dear supporter No ***:
We have helped you to check cause 1, cause 2 . . . cause n. We found that there are more than 99.9% probability that they are mutually dependent.
Below are a plurality of probable possible causes and their probabilities:
Cause 1: *** probability;
Cause 2: *** probability;
Cause 3: *** probability
Please check the causes and merge the mutually dependent causes.

The answer support system first determines the most probable cause for the current symptoms by calculating the known information ratio. Then the system obtains the remaining attribute most likely to differentiate the most probable cause from other causes by calculating the information gains of the remaining attributes. Based on this they system obtains the corresponding symptom by asking the customer about the attribute, which symptom is very likely to be enough to differentiate the most probable cause from the other causes. In this way, the answer support system can find the cause of the symptoms quickly, thus asking the customer relatively few questions.

Figure 4A:
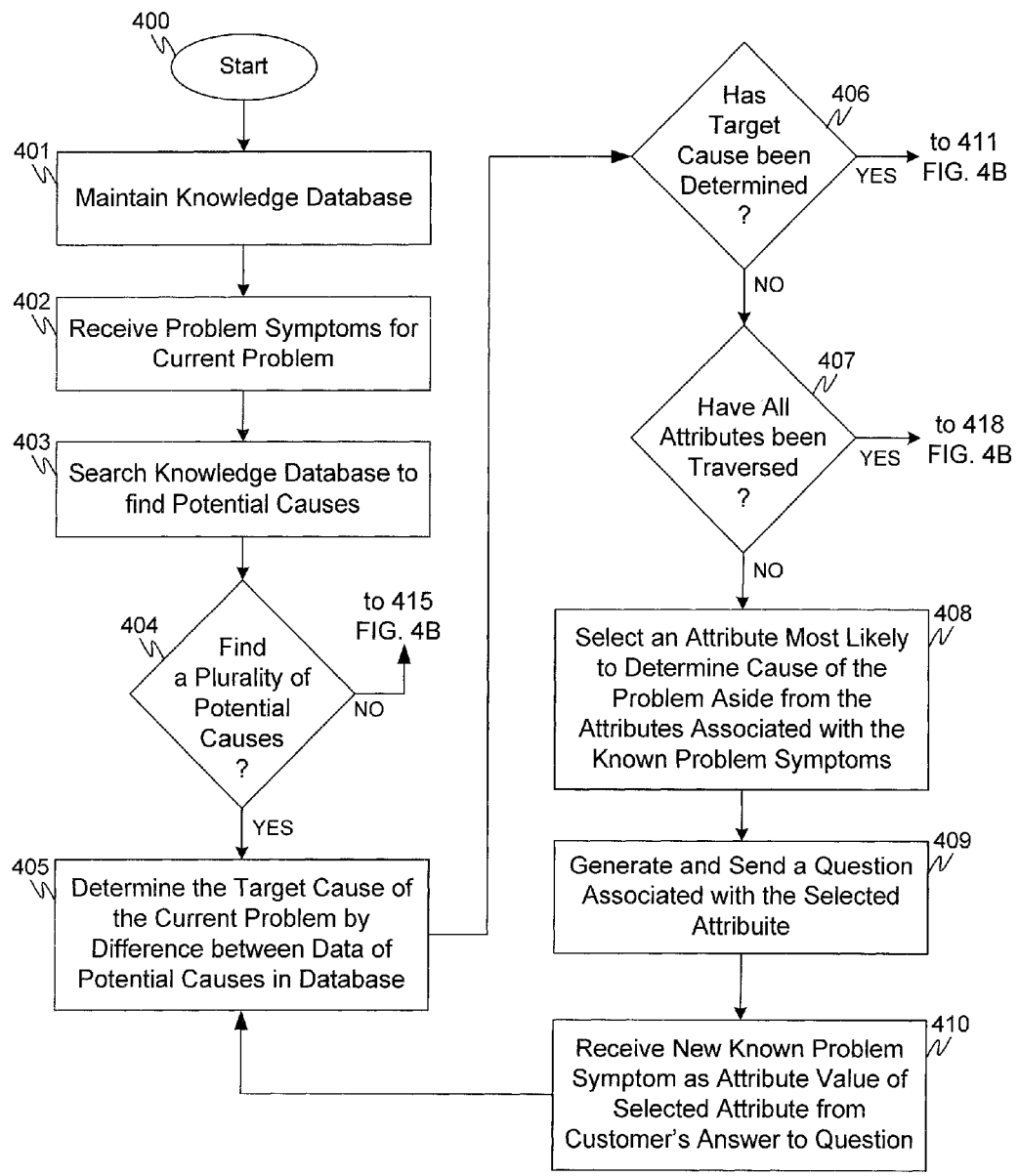
FIGS. 4A-B depict a flow chart of an answer support method according an embodiment disclosed herein.
Figure 4B:
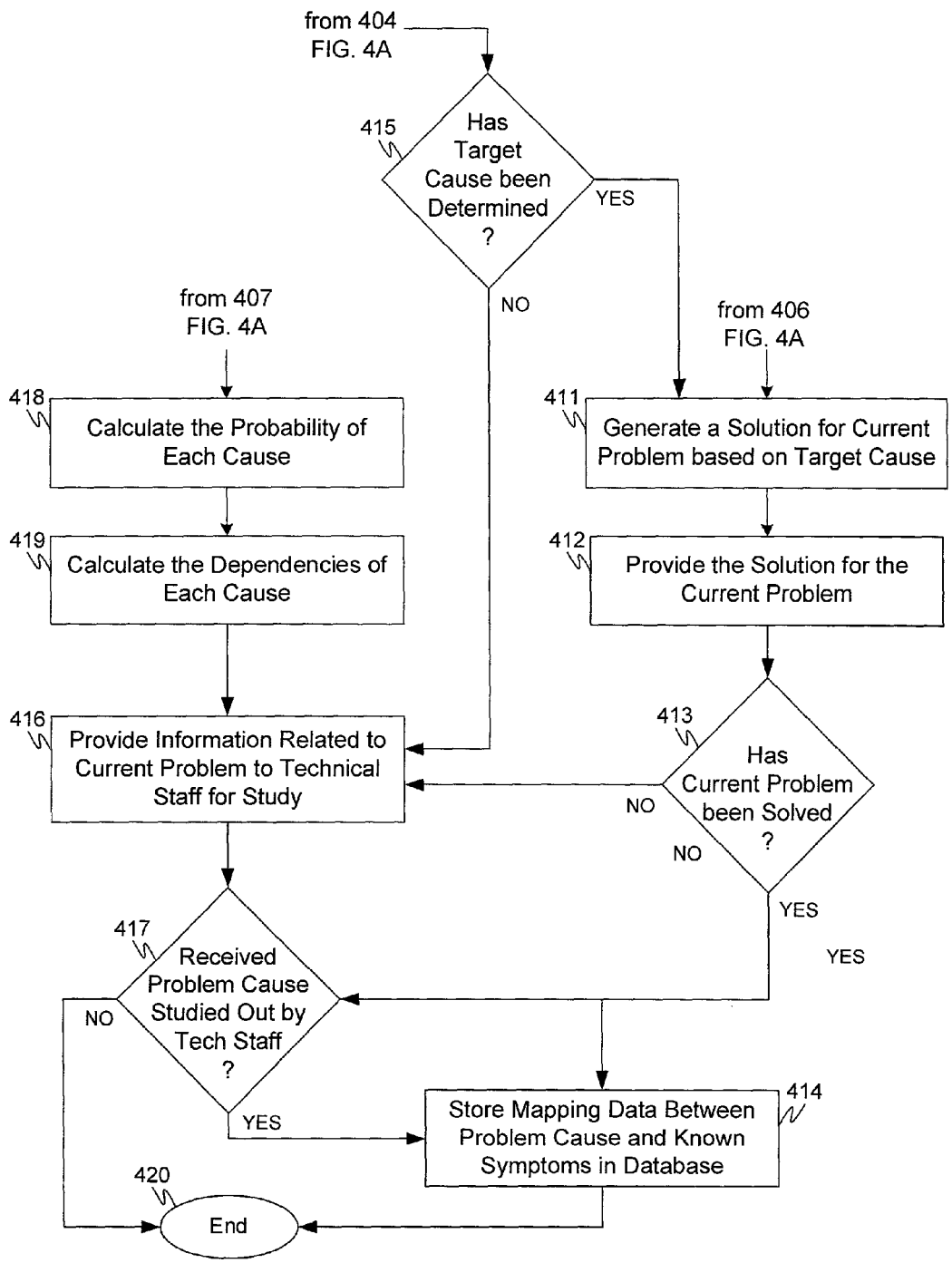

FIGS. 4A-B depict a flow chart of an answer support method according to an embodiment disclosed herein. For the sake of simplicity and clarity some details repetitive with the above description are omitted in the following description. In step 401 of FIG. 4A a knowledge database containing historical data on mapping relationships between problem causes and a set of problem symptoms is maintained, with problem symptoms being represented as the attribute values of attributes in a set of attributes.

According to various embodiments the structure of the knowledge database is optionally a matrix, its rows represent problem causes, its columns represent attributes as well as problem symptoms as attribute values under each attributes, and its elements represent the number values of respective problem causes with respect to respective problem symptoms.

In step 402, one or more known problem symptoms of the current problem are received. In step 403, the knowledge database is searched by using the received one or more known problem symptoms to find out potential causes corresponding to the one or more known problem symptoms. Step 404 determines whether multiple potential causes are found. If causes are found the method proceeds to step 405. Otherwise, the method proceeds to step 415 of FIG. 4B.

In step 405, the target cause of the current problem is determined according to the difference between the historical data of the plurality of potential causes with respect to the known problem symptoms in the knowledge database. According to at least one embodiment step 405 optionally includes the following four sub-steps:

(1) Calculating the known information ratio of each potential cause in the plurality of potential causes, wherein the known information ratio of each potential cause is calculated as the sum of the number values of the potential cause with respect to the known problem symptoms divided by the sum of the number values of the potential cause with respect to the known problem symptoms plus the sum of the number values of the potential cause with respect to all the problem symptoms of all the remaining attributes besides the attributes to which the known problem symptoms belong.

(2) Sorting the plurality of potential causes in descending order according to their known information ratios;

(3) Determining whether the difference between the known information ratios of the potential cause with the maximum known information ratio and the potential cause with the second maximum known information ratio is greater than a threshold; and (4) In response to the determination being yes, determining the potential cause with the maximum known information ratio as the target cause of the current problem.

According various embodiments the threshold is optionally the average value of the differences between the known information ratios of every two adjacent potential causes in the sorted plurality of potential causes. Step 406 of FIG. 4A determines whether the target cause of the current problem has been determined. If the determination is no, the method proceeds along the "NO" path to step 407. However, the target cause of the problem has been determined as per step 406, then the method proceeds along the "YES" path to step 411 of FIG. 4B.

In step 407, it is determined whether all the remaining attributes have been traversed. If the determination is no, the method proceeds to step 408. Otherwise, the method proceeds to step 418 of FIG. 4B if there are remaining attributes. In step 408, in response to being unable to determine the target cause of the current problem, an attribute is selected from the remaining attributes for determining its attribute value. The attribute is selected from the set of attributes in the historical data of the plurality of potential causes in the knowledge database. The selected attribute is preferably one other than those attributes associated with the known problem symptoms. The attribute is selected on the basis of it being the most likely to be able to determine the target cause of the current problem from the found plurality of potential causes.

According to various embodiments, the attribute selection process of step 408 may optionally include the following two sub-steps:

(1) Calculating the information gain for each remaining attribute not yet selected (or in some embodiments, attributes not yet considered). This may be done by using the number values of the potential causes having the maximum information ratio among the plurality of potential causes with respect to the problem symptoms in the remaining attribute as the number of positive examples. The calculation may also use the number values of all the other potential causes in the plurality of potential causes with respect to the problem symptoms in the remaining attribute as the number of negative examples.

(2) Selecting the remaining attribute with the maximum information gain in the remaining attributes as the attribute to be determined.

Turning again to FIG. 4A, in step 409 a question including the selected attribute is generated and sent. The method proceeds to step 410 where a new known problem symptom as the attribute value of the selected attribute is received from the answer to the question. Then, the process returns from 410 to step 405 to perform steps 405-410 iteratively, until the determination in step 406 is "YES"—that is, the target cause of the current problem has been determined—in which case the method proceeds to block 411 of FIG. 4B. Alternatively, if the determination in step 407 is "YES"—that is, the attribute values of all the remaining attributes have been determined and the target cause of the current problem can still not be determined—then the method proceeds from 407 along the "YES" path to 418 of FIG. 4B.

In step 411 of FIG. 4B, a solution to the current problem may be generated according to the determined target cause of the current problem. In step 412, the solution to the current problem may optionally be provided. For example, the solution to the current problem is provided to the customer by the first-line support staff. Step 413 may determine whether the current problem has been solved based on feedback received from the customer. If the determination is "yes" and the problem has been solved the method proceeds to step 414. However, if it is determined that the problem has not yet been solves the method proceeds along the "NO" path to step 416. In block 416 information related to the current problem is provided to the technical staff for study, for example, by providing one or more problem symptoms collected from the customer to the technical staff for study. In step 414, the mapping relationship between the target cause of the current problem and the problem symptoms may optionally be stored in the knowledge database. For example, the number value of the cause row with respect to each relevant symptom in the knowledge database is added by 1. Once the mapping relationship has been stored the process ends.

Turning back to block 404 of FIG. 4A, in response to determining that a plurality of potential causes have not been found in step 404, the method proceeds along the "NO" pat to 415 of FIG. 4B. In step 415 it is determined whether a single potential cause is found, that is, determining whether a single potential cause is found, or no potential cause is found. If the determination is yes, then step 411 is performed, in which the potential cause is used as the target cause so as to generate a solution to the current problem. If the determination is "NO", then step 416 is performed. In step 416, information related to the current problem may optionally be provided to the technical staff for study. For example, one or more problem symptoms collected from the customer are provided to the technical staff for study, or one or more problem symptoms collected from the customer and a plurality of potential causes generated by the system and their probabilities are provided to the technical staff for study. The method then proceeds to block 417.

Step 417 determines whether a problem cause studied out by the technical staff is received. If the determination is "YES" the method proceeds to step 414 to store the mapping relationship between the problem cause and relevant symptoms into the knowledge database. In an alternative embodiment, if the determination in 417 is "YES" then steps 411-414 may be performed to generate a solution to the current problem according to the problem cause, provide the solution to the customer, and then store the mapping relationship of the problem cause and related symptoms into the knowledge database after receiving a feedback from the customer that the problem has been solved. Returning to block 417, if the determination in 417 is "NO", then the process ends, or other relevant processing is performed.

In response to determining that all the attributes have been traversed in step 407 of FIG. 4A, the method may proceed to step 418 of FIG. 4B. Step 418 calculates the probability of each of a plurality of potential causes corresponding to the one or more known problem symptoms found in the knowledge database. According to various embodiments, calculating the probability of each potential cause may optionally include the following sub-steps:

(1) Calculating the sum of the number values of each potential cause with respect to the one or more known problem symptoms.

(2) Adding the sums of the number values of all the potential causes with respect to the one or more known problem symptoms to get a total sum.

(3) Dividing the sum of the number values of each potential cause with respect to the one or more known problem symptoms by the total sum, and taking the resultant quotient as the probability of the each potential cause.

In step 419, dependencies between multiple potential causes corresponding to the one or more known problem symptoms found in the knowledge database may optionally be calculated. According to various embodiments the calculation of dependencies between the potential causes may be performed by using Chi-square analysis. Then, step 416 may be performed to provide information related to the current problem, like the found plurality of potential causes, probabilities of the potential causes, dependencies between potential causes, and the one or more known symptoms etc., to the technical staff for study. Alternatively, the process may first go to step 411 to generate a corresponding solution according to the found plurality of potential causes and provide the solution to the customer.

The process of the answer support method according various embodiments has been described above. It should be pointed out that the above description, while a typical embodiment, does not limit the scope of the present invention. In other embodiments the method may have more steps, fewer steps, or different steps, and the order between the steps may be different from that described above. For example, the above steps 411-419 may be optional in various embodiments, and one or more may be omitted.

Figure 5:
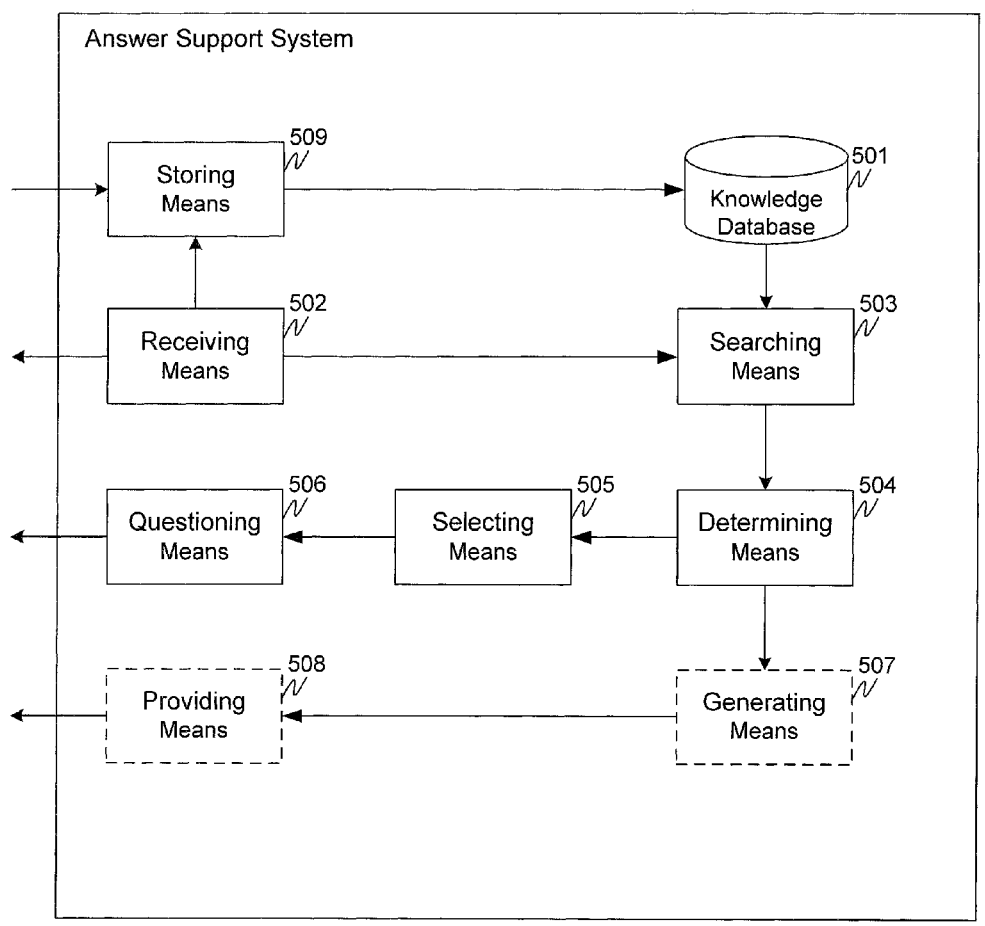
FIG. 5 depicts a structural composition of an answer support system according to an embodiment disclosed herein.

FIG. 5 depicts a structural composition of an answer support system according to an embodiment disclosed herein. For the sake of simplicity and clarity some details repetitive with the above description may be omitted from the following description. Thus, a more detailed understanding of the system can be obtained by referring to the description. According to various embodiments disclosed herein, the answer support system includes a knowledge database 501, receiving means 502, searching means 503, determining means 504, selecting means 505, and questioning means 506. These components may be implemented by the computer system depicted in FIG. 6, as would be known by those of ordinary skill in the art.

The knowledge database 501 contains historical data on mapping relationships between problem causes and a set of problem symptoms as attribute values of a set of attributes. The receiving means 502 is configured to receive one or more known problem symptoms of the current problem. The searching means 503 is configured to search the knowledge database 501 by using the received one or more problem symptoms to find potential causes corresponding to the one or more problem symptoms. The determining means 504 is configured to use the results of the searching means 503 to find one or more potential causes, determining the target cause of the current problem according to the difference between the historical data of the plurality of potential causes with respect to the known problem symptoms in the knowledge base 501. If the determining means 504 is unable to determine the target cause of the current problem the selecting means 505 is configured to select an attribute. The selected attribute has an attribute value selected from among attributes besides the attributes to which the known problem symptom belong in the set of attributes, according to the historical data of the potential causes in the knowledge database 501. The attribute value is selected on the basis of being most likely to be able to determine the target cause of the current problem from the found plurality of potential causes. The questioning means 506 is configured to generate and send a question including the selected attribute. The receiving means 502 is further configured to receive a new known problem symptom as the attribute value of the selected attribute from the answer to the question. Moreover, the determining means 504, the selecting means 505, the questioning means 506 and the receiving means 502 may perform their operations iteratively, until the target cause of the current problem is determined, or the attribute values of all the remaining attributes have been determined and the target cause of the current problem can still not be determined.

According to various embodiments, the system optionally further comprises: generating means 507 for generating a solution to the current problem according to the determined target cause of the current problem; providing means 508 for providing the solution to the current problem; storing means 509 for, in response to receiving a feedback that the current problem has been solved, storing the mapping relationship between the target cause of the current problem and the problem symptoms into the knowledge database 501.

In according with various embodiments the determining means 504 may be further configured to, in response to the searching means 503 finding a single potential cause corresponding to the one or more problem symptoms, determine the potential cause as the target cause of the current problem. The providing means 508 may be further configured to, in response to the searching means 503 finding no potential cause corresponding to the one or more problem symptoms, provide the one or more problem symptoms to the technical staff for study. The storing means 509 may be further configured to, in response to receiving a problem cause studied out by the technical staff, store the mapping relationship between the problem cause and the problem symptoms into the knowledge database 501.

According to various embodiments the providing means 508 operates in conjunction with the determining means 504, the selecting means 505, the questioning means 506 and the receiving means 502 performing their operations iteratively to determine the attribute values of all the remaining attributes. If the system cannot determine the target cause of the current problem the providing means 508 may be further configured to provide the received known problem symptom(s) and potential cause(s) corresponding to the one or more known problem symptoms found in the knowledge database 501 to the technical staff for study. The storing means 509 is configured to store the mapping relationship between the problem cause and the known problem symptoms into the knowledge database 501 for a problem cause studied out by the technical staff. According to various embodiments, the knowledge database 501 may be structure as a matrix, for example, with its rows representing problem causes and its columns representing attributes and problem symptoms as attribute values under each attribute. The elements of the matrix may represent the number values of the corresponding problem causes with respect to the corresponding problem symptoms.

According various embodiments the determining means 504 may be configured to calculate a known information ratio of each potential cause in the plurality of potential causes. The known information effective ratio of each potential cause may be calculated as the sum of the number values of the potential cause with respect to the know problem symptoms divided by the sum of the number values of the potential cause with respect to the known problem symptoms plus the sum of the number values of the potential cause with respect to all the problem symptoms of all the remaining attributes besides the attributes to which the known problem symptoms belong. The determining means 504 may also sort multiple potential causes in a descending order according to their known information ratios. The determining means 504 may be configured to determine whether the difference between the known information ratios of the potential cause with the maximum information ratio and the potential cause with the second maximum known information ratio is greater than a threshold. If the threshold is met the determining means 504 may determine the potential cause having the maximum known information to be the target cause of the current problem. The threshold may be specified as the average value of the differences between the known information ratios of every two adjacent potential causes in the sorted plurality of potential causes.

According to various embodiments, the selecting means 505 may be configured to calculate information gain of the remaining attribute, and select the remaining attribute with the maximum information gain in the remaining attributes as the attribute to be determined. This may be done for each remaining attribute in the remaining attributes, by using the number values of the potential cause with the maximum known information ratio in the plurality of potential causes with respect to the problem symptoms in the remaining attribute as the number of positive examples, using the number values of all the other potential causes in the plurality of potential causes with respect to the problem symptoms in the remaining attribute.

According to various embodiments, the system may further include probability calculation means configured to operate in conjunction with the determining means 504, the selecting means 505, the questioning means 506, the receiving means 502 in an iteratively manner. The probability calculating means may be configured to calculate the sum of the number values of each potential cause with respect to the one or more known problem symptoms, adding the sums of the number values of all the potential causes with respect to the one or more known problem symptoms to get a total sum; and then dividing the sum of the number values of each potential cause with respect to the one or more known problem symptoms by the total sum. The probability calculating means may use the resultant quotient as the probability of the each potential cause. According to various embodiments the system may further include dependency calculating means configured to calculate the dependencies between the plurality of potential causes, for example, using Chi-square analysis.

Figure 6:
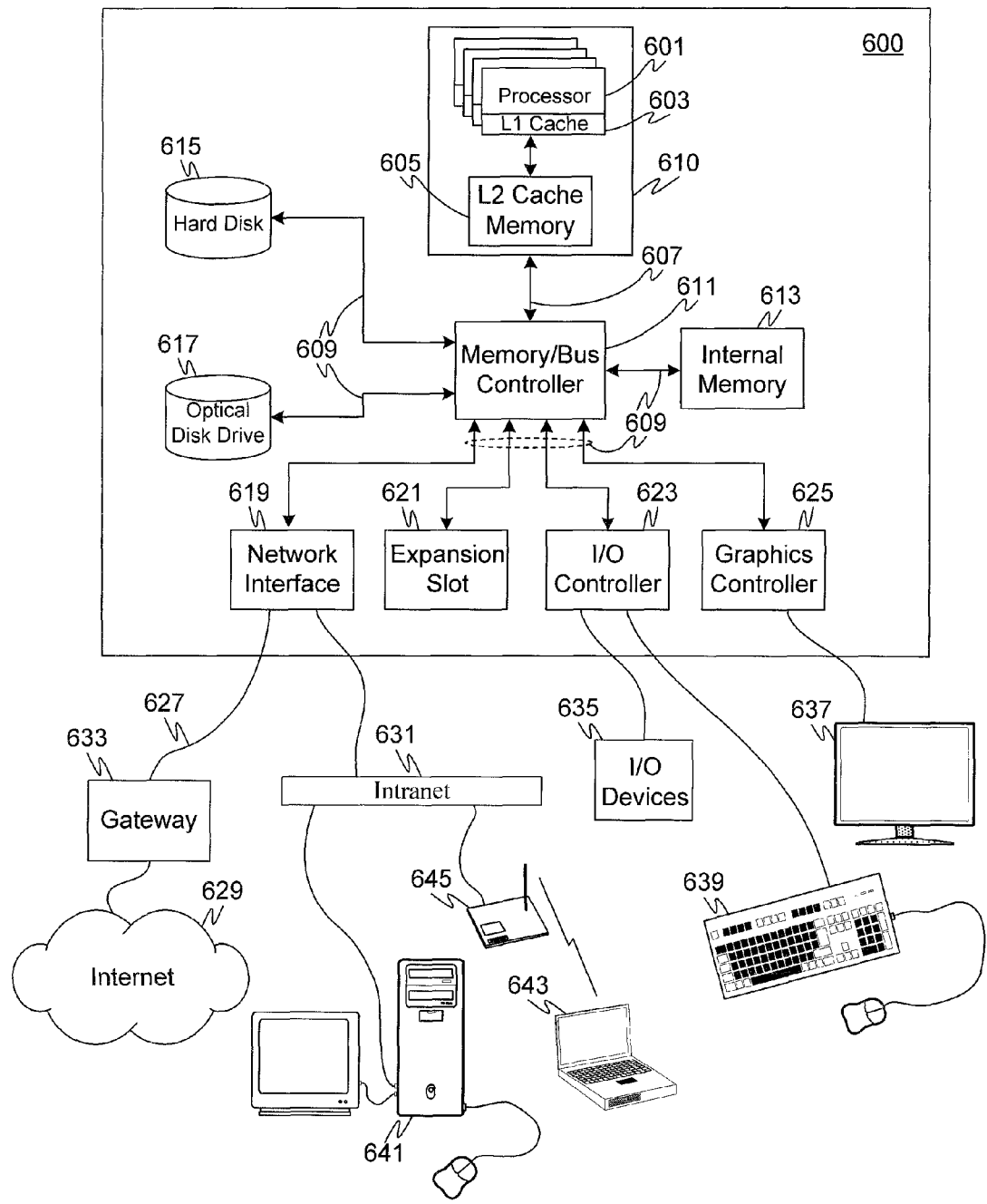
FIG. 6 depicts a computer system 600 and various components suitable for implementing various embodiments disclosed herein.

FIG. 6 depicts a computer system 600 and components suitable for implementing the various embodiments disclosed herein. The computer system 600 may be configured in the form of a desktop computer, a laptop computer, a mainframe computer, or any other hardware or logic arrangement capable of being programmed or configured to carry out instructions. In some embodiments the computer system 600 may act as a server, accepting inputs from a remote user over a local area network (LAN) 627, the Internet 629, or an intranet 631. In other embodiments, the computer system 600 may function as a smart user interface device for a server on the LAN 627 or over the Internet 629. The computer system 600 may be located and interconnected in one location, or may be distributed in various locations and interconnected via communication links such as a LAN 627 or a wide area network (WAN), via the Internet 629, via the public switched telephone network (PSTN), a switching network, a cellular telephone network, a wireless link, or other such communication links. Other devices may also be suitable for implementing or practicing the embodiments, or a portion of the embodiments. Such devices include personal digital assistants (PDA), wireless handsets (e.g., a cellular telephone or pager), and other such electronic devices preferably capable of being programmed to carry out instructions or routines. Those of ordinary skill in the art may recognize that many different architectures may be suitable for the computer system 600, although only one typical architecture is depicted in FIG. 6.

Computer system 600 may include a processor 601 which may be embodied as a microprocessor, two or more parallel processors as shown in FIG. 6, a central processing unit (CPU) or other such control logic or circuitry. The processor 601 may be configured to access a local cache memory 603, and send requests for data that are not found in the local cache memory 603 across a cache bus to a second level cache memory 605. Some embodiments may integrate the processor 601, and the local cache 603 onto a single integrated circuit and other embodiments may utilize a single level cache memory or no cache memory at all. Other embodiments may integrate multiple processors 601 onto a single die and/or into a single package. Yet other embodiments may integrate multiple processors 601 with multiple local cache memories 603 with a second level cache memory 605 into a single package 610 with a front side bus 607 to communicate to a memory/bus controller 611. The memory/bus controller 611 may accept accesses from the processor(s) 601 and direct them to either the internal memory 613 or to the various input/output (I/O) busses 609. Some embodiments of the computer system 600 may include multiple processor packages 610 sharing the front-side bus 607 to the memory/bus controller. Other embodiments may have multiple processor packages 610 with independent front-side bus connections to the memory/bus controller. The memory bus controller may communicate with the internal memory 613 using a memory bus 609.

The internal memory 613 may include one or more of random access memory (RAM) devices such as synchronous dynamic random access memories (SDRAM), double data rate (DDR) memories, or other volatile random access memories. The internal memory 613 may also include non-volatile memories such as electrically erasable/programmable read-only memory (EEPROM), NAND flash memory, NOR flash memory, programmable read-only memory (PROM), read-only memory (ROM), battery backed-up RAM, or other non-volatile memories. In some embodiments, the computer system 600 may also include $3^{rd}$ level cache memory or a combination of these or other like types of circuitry configured to store information in a retrievable format. In some implementations the internal memory 613 may be configured as part of the processor 601, or alternatively, may be configured separate from it but within the same package 610. The processor 601 may be able to access internal memory 613 via a different bus or control lines than is used to access the other components of computer system 600.

The computer system 600 may also include, or have access to, one or more hard drives 615 (or other types of storage memory) and optical disk drives 617. Hard drives 615 and the optical disks for optical disk drives 617 are examples of machine readable (also called computer readable) mediums suitable for storing the final or interim results of the various embodiments. The optical disk drives 617 may include a combination of several disc drives of various formats that can read and/or write to removable storage media (e.g., CD-R, CD-RW, DVD, DVD-R, DVD-W, DVD-RW, HD-DVD, Blu-Ray, and the like). Other forms or computer readable media that may be included in some embodiments of computer system 600 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable or machine readable storage medium.

The computer system 600 may either include the hard drives 615 and optical disk drives 617 as an integral part of the computer system 600 (e.g., within the same cabinet or enclosure and/or using the same power supply), as connected peripherals, or may access the hard drives 615 and optical disk drives 615 over a network, or a combination of these. The hard drive 615 often includes a rotating magnetic medium configured for the storage and retrieval of data, computer programs or other information. In some embodiments, the hard drive 615 may be a solid state drive using semiconductor memories. In other embodiments, some other type of computer useable medium may be used. The hard drive 615 need not necessarily be contained within the computer system 600. For example, in some embodiments the hard drive 615 may be server storage space within a network that is accessible to the computer system 600 for the storage and retrieval of data, computer programs or other information. In some instances the computer system 600 may use storage space at a server storage farm, or like type of storage facility, that is accessible by the Internet 629 or other communications lines. The hard drive 615 is often used to store the software, instructions and programs executed by the computer system 600, including for example, all or parts of the computer application program for carrying out activities of the various embodiments.

The communication link 609 may be used to access the contents of the hard drives 615 and optical disk drives 617. The communication links 609 may be point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium. The memory/bus controller may also provide other I/O communication links 609. In some embodiments, the links 609 may be a shared bus architecture such as peripheral component interface (PCI), microchannel, industry standard architecture (ISA) bus, extended industry standard architecture (EISA) bus, VERSAmoduleEurocard (VME) bus, or any other shared computer bus. In other embodiments, the links 609 may be a point-to-point link such as PCI-Express, HyperTransport, or any other point-to-point I/O link. Various I/O devices may be configured as a part of the computer system 600.

In many embodiments, a network interface 619 may be included to allow the computer system 600 to connect to a network 627 or 631. Either of the networks 627 and 631 may operate in accordance with standards for an IEEE 802.3 ethernet network, an IEEE 802.11 Wi-Fi wireless network, or any other type of computer network including, but not limited to, LANs, WAN, personal area networks (PAN), wired networks, radio frequency networks, powerline networks, and optical networks. A network gateway 633 or router, which may be a separate component from the computer system 600 or may be included as an integral part of the computer system 600, may be connected to the networks 627 and/or 631 to allow the computer system 600 to communicate with the Internet 629 over an internet connection such as an asymmetric digital subscriber line (ADSL), data over cable service interface specification (DOCSIS) link, T1 or other internet connection mechanism. In other embodiments, the computer system 600 may have a direct connection to the Internet 629. The computer system 600 may be connected to one or more other computers such as desktop computer 641 or laptop computer 643 via the Internet 629, an intranet 631, and/or a wireless node 645. In some embodiments, an expansion slot 621 may be included to allow a user to add additional functionality to the computer system 600.

The computer system 600 may include an I/O controller 623 providing access to external communication interfaces such as universal serial bus (USB) connections, serial ports such as RS-232, parallel ports, audio in and audio out connections, the high performance serial bus IEEE-1394 and/or other communication links. These connections may also have separate circuitry in some embodiments, or may be connected through a bridge to another computer communication link provided by the I/O controller 623. A graphics controller 625 may also be provided to allow applications running on the processor 601 to display information to a user. The graphics controller 625 may output video through a video port that may utilize a standard or proprietary format such as an analog video graphic array (VGA) connection, a digital video interface (DVI), a digital high definition multimedia interface (HDMI) connection, or any other video connection. The video connection may connect to display 637 to present the video information to the user.

The display 637 may be any of several types of displays or computer monitors, including a liquid crystal display (LCD), a cathode ray tube (CRT) monitor, on organic light emitting diode (OLED) array, or other type of display suitable for displaying information for the user. The display 637 may include one or more light emitting diode (LED) indicator lights, or other such display devices. Typically, the computer system 600 includes one or more user input/output (I/O) devices such as a keyboard and mouse 639, and/or other means of controlling the cursor represented including but not limited to a touchscreen, touchpad, joystick, trackball, tablet, or other device. The user I/O devices 635 may connect to the computer system 600 using USB interfaces or other connections such as RS-232, PS/2 connector or other interfaces. Various embodiments include input devices configured to accept an input from a user and/or provide an output to a user. For example, some embodiments may include a webcam (e.g., connect via USB), a microphone (e.g., connected to an audio input connection), and/or speakers (e.g., connected to an audio output connection). The computer system 600 typically has a keyboard and mouse 639, a monitor 637, and may be configured to include speakers, microphone, and a webcam. These input/output devices may be used in various combinations, or separately, as means for presenting information to the user and/or receiving information and other inputs from a user to be used in carrying out various programs and calculations. Speech recognition software may be used in conjunction with the microphone to receive and interpret user speech commands.

The processor 501 may be embodied as a microprocessor, microcontroller, DSP, RISC processor, two or more parallel processors, or any other type of processing unit that one of ordinary skill would recognize as being capable of performing or controlling the functions, steps, activities and methods described herein. A processing unit in accordance with at least one of the various embodiments can operate computer software programs stored (embodied) on computer-readable medium such those compatible with the disk drives 515, the optical disk drive 517 or any other type of hard disk drive, floppy disk, flash memory, ram, or other computer readable medium as recognized by those of ordinary skill in the art.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "circuit," "module," "logic" or "system." Furthermore, aspects of the various embodiments may take the form of a computer program product embodied in one or more computer readable medium(s) having computer readable program code stored thereon.

Any combination of one or more computer readable medium(s) may be utilized. The computer readable medium is typically a non-transitory computer readable storage medium. Such a non-transitory computer readable storage medium may be embodied as, for example, an electronic, magnetic, optical, electromagnetic, infrared, or semiconductor system, apparatus, or device, or other like storage devices known to those of ordinary skill in the art, or any suitable combination of the foregoing. Examples of such computer readable storage medium include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations and aspects of the various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus, systems, and computer program products according to various embodiments disclosed herein. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, a programmable data processing apparatus, or other such devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur in an order other than that depicted in the figures. For example, two blocks shown in succession may, in fact, be executed substantially concurrently, or the blocks and activities of the figures may sometimes be executed in reverse order or in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "obtaining", as used herein and in the claims, may mean either retrieving from a computer readable storage medium, receiving from another computer program, receiving from a user, calculating based on other input, or any other means of obtaining a datum or set of data. The term "plurality", as used herein and in the claims, means two or more of a named element. It should not, however, be interpreted to necessarily refer to every instance of the named element in the entire device. Particularly, if there is a reference to "each" element of a "plurality" of elements. There may be additional elements in the entire device that are not be included in the "plurality" and are not, therefore, referred to by "each."

The structural composition of the answer support system has been described above according to various embodiments. It should be pointed out that the above description provides a typical example embodiment for the purposes of explanation and clarity, rather than serving as a limitation to the scope of the present invention. In other embodiments the apparatus may have more, or fewer, or different, hardware units or modules, and the relationships between the modules may be different from that described.

The various embodiments may be implemented in hardware, software, or a combination of the two. The various embodiments may be implemented in a computer system in a centralized manner, or in a distributed manner in which different components are distributed among several interconnected computer systems. Any computer system or other devices suitable for executing the method described herein are applicable, for example, as disclosed above. A typical combination of hardware and software can be a computer system with a computer program, which upon being loaded and executed, controls the computer system to execute the method of the various embodiments disclosed herein, and constitutes an apparatus to implement the various embodiments.

The various embodiments, for example, the methods and steps disclosed herein, can also be embodied in a computer program product, which, upon being loaded into a computer system and executed, can carry out the method. The computer program instructions may also be stored in a computer readable medium that can direct a computer, a programmable data processing apparatus, or other such devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur in an order other than that depicted in the figures. For example, two blocks shown in succession may, in fact, be executed substantially concurrently, or the blocks and activities of the figures may sometimes be executed in reverse order or in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. This description has been presented for purposes of illustration and description, but is not intended to be exhaustive or limited to the embodiments in the form disclosed. Although the present invention has been illustrated and described with reference to the various embodiments described above, those of ordinary skill in the art will understand that various changes both in form and details may be made thereto without departing from the gist and scope of the present invention.

What is claimed is:

1. A method of generating a target cause in an answer support system to aid in solving a current problem, comprising:

receiving known problem symptoms of the current problem, said known problem symptoms being included among stored problem symptoms associated with problem causes stored in a knowledge database;

searching the problem causes in said knowledge database to find a plurality of potential causes corresponding to the known problem symptoms;

attempting to determine a target cause of the current problem from among the plurality of potential causes based on attributes associated with the known problem symptoms;

in response to an inability to determine the target cause of the current problem, choosing as a selected attribute an attribute which is not among the attributes associated with the known problem symptoms, wherein an attribute value of the selected attribute is determined to be most likely to identify the target cause of the current problem from said plurality of potential causes found in the knowledge database;

determining the selected attribute to be an attribute having maximum information gain which is not among the attributes associated with the known problem symptoms, the maximum information gain being based on an entropy value calculation taking into account positive and negative examples of remaining attributes;

determining the target cause based on the selected attribute; and generating a solution based on the target cause.

2. The method of claim 1, further comprising:

maintaining the knowledge database to contain historical data mapping relationships between the problem causes and the stored problem symptoms;

wherein said attempting to determine the target cause is based on a difference between the historical data for the plurality of potential causes with respect to the known problem symptoms in the knowledge database.

3. The method of claim 1, wherein the selected attribute is a first selected attribute and the target cause is a first target cause, the method further comprising:

generating and sending a question associated with the selected attribute;

receiving as an answer to the question a new known problem symptom, and using the new known problem symptom as an attribute value for a second selected attribute; and determining a second target cause based on the second selected attribute.

4. The method of claim 1, further comprising:

providing the solution to the current problem to a customer; and in response to receiving a feedback that the current problem has been solved, storing the mapping relationship between the target cause of the current problem and the problem symptoms into the knowledge database.

5. The method of claim 1, wherein the structure of the knowledge database is a matrix, its rows represent the problem causes, its columns represent the attributes associated with the stored problem symptoms; and wherein elements in said matrix are number values representing respective ones of the attributes associated with the stored problem symptoms.

6. The method of claim 1, wherein the attempt to determine the target cause of the current problem is based on a known information ratio, the method further comprising:

calculating a known information ratio of each potential cause in the plurality of potential causes, wherein, the known information ratio of each potential cause is calculated as a sum of number values of the potential cause with respect to the known problem symptoms divided by the sum of the number values of the potential cause with respect to the known problem symptoms plus the sum of the number values of the potential cause with respect to all the problem symptoms of all the remaining attributes besides the attributes to which the known problem symptoms belong;

sorting the plurality of potential causes in descending order according to their known information ratios;

determining whether the difference between the known information ratios of the potential cause having a maximum known information effective ratio and the potential cause having a second maximum known information ratio is greater than a threshold; and in response to the determination being yes, determining the potential cause with the maximum known information ratio as the target cause of the current problem.

7. The method of claim 6, wherein the threshold is the average value of the differences between the known information ratios of every two adjacent potential causes of the sorted plurality of potential causes.

8. The method of claim 6, further comprising:

for each remaining attribute in the remaining attributes, by using the number values of the potential cause with the maximum known information ratio in the plurality of potential causes with respect to the problem symptoms in the remaining attribute as the number of positive examples, and using the number values of all the other potential causes in the plurality of potential causes with respect to the problem symptoms in the remaining attribute as the number of negative examples, calculating the information gain of the remaining attribute; and selecting the remaining attribute having a maximum information gain in the remaining attributes as the attribute to be determined.

9. The method of claim 6, wherein calculating dependencies of the plurality of causes is performed by using the Chi-square analysis, the method further comprising:

generating and sending a question associated with the selected attribute; and receiving as an answer to the question a new known problem symptom;

wherein the determining of the target cause is based on the new known problem symptom received as the answer to the question associated with the selected attribute.

10. A computer program product comprising a machine readable non-transitory medium including a program of instructions for generating a target cause in an answer support system to aid in solving a current problem, wherein the program of instructions upon being executed on a computer causes the computer to perform activities comprising:

receiving known problem symptoms of the current problem, said known problem symptoms being included among stored problem symptoms associated with problem causes stored in a knowledge database;

searching the problem causes in said knowledge database to find a plurality of potential causes corresponding to the known problem symptoms;

attempting to determine a target cause of the current problem from among the plurality of potential causes based on attributes associated with the known problem symptoms;

in response to an inability to determine the target cause of the current problem, choosing as a selected attribute an attribute which is not among the attributes associated with the known problem symptoms, wherein an attribute value of the selected attribute is determined to be most likely to identify the target cause of the current problem from said plurality of potential causes found in the knowledge database;

determining the selected attribute to be an attribute having maximum information gain which is not among the attributes associated with the known problem symptoms, the maximum information gain being based on an entropy value calculation taking into account positive and negative examples of remaining attributes;

determining the target cause based on the selected attribute; and generating a solution based on the target cause.

11. The computer program product of claim 10, further comprising:

maintaining the knowledge database to contain historical data mapping relationships between the problem causes and the stored problem symptoms;

wherein said attempting to determine the target cause is based on a difference between the historical data for the plurality of potential causes with respect to the known problem symptoms in the knowledge database.

12. The computer program product of claim 10, wherein the selected attribute is a first selected attribute and the target cause is a first target cause, the computer program product further comprising:
  generating and sending a question associated with the selected attribute;
  receiving as an answer to the question a new known problem symptom, and using the new known problem symptom as an attribute value for a second selected attribute; and
  determining a second target cause based on the second selected attribute.

13. The computer program product of claim 10, further comprising:
  providing the solution to the current problem to a customer; and
  in response to receiving a feedback that the current problem has been solved, storing the mapping relationship between the target cause of the current problem and the problem symptoms into the knowledge database.

14. The computer program product of claim 10, wherein the structure of the knowledge database is a matrix, its rows represent the problem causes, its columns represent the attributes associated with the stored problem symptoms; and
  wherein elements in said matrix are number values representing respective ones of the attributes associated with the stored problem symptoms.

15. The computer program product of claim 10, wherein the attempt to determine the target cause of the current problem is based on a known information ratio, the computer program product further comprising:
  calculating a known information ratio of each potential cause in the plurality of potential causes, wherein, the known information ratio of each potential cause is calculated as a sum of number values of the potential cause with respect to the known problem symptoms divided by the sum of the number values of the potential cause with respect to the known problem symptoms plus the sum of the number values of the potential cause with respect to all the problem symptoms of all the remaining attributes besides the attributes to which the known problem symptoms belong;
  sorting the plurality of potential causes in descending order according to their known information ratios;
  determining whether the difference between the known information ratios of the potential cause having a maximum known information effective ratio and the potential cause having a second maximum known information ratio is greater than a threshold; and
  in response to the determination being yes, determining the potential cause with the maximum known information ratio as the target cause of the current problem.

16. The computer program product of claim 15, wherein the threshold is the average value of the differences between the known information ratios of every two adjacent potential causes of the sorted plurality of potential causes.

17. The computer program product of claim 15, further comprising:
  for each remaining attribute in the remaining attributes, by using the number values of the potential cause with the maximum known information ratio in the plurality of potential causes with respect to the problem symptoms in the remaining attribute as the number of positive examples, and using the number values of all the other potential causes in the plurality of potential causes with respect to the problem symptoms in the remaining attribute as the number of negative examples, calculating the information gain of the remaining attribute; and
  selecting the remaining attribute having a maximum information gain in the remaining attributes as the attribute to be determined.

18. The computer program product of claim 15, wherein calculating dependencies of the plurality of causes is performed by using the Chi-square analysis, the computer program product further comprising:
  generating and sending a question associated with the selected attribute; and
  receiving as an answer to the question a new known problem symptom;
  wherein the determining of the target cause is based on the new known problem symptom received as the answer to the question associated with the selected attribute.

19. An answer support system configured to generate a target cause to aid in solving a current problem, comprising:
  a network interface configured to receive known problem symptoms of the current problem;
  a storage memory configured to store a knowledge database comprising said known problem symptoms included among stored problem symptoms associated with problem causes, wherein said knowledge database is configured for searching the problem causes to find a plurality of potential causes corresponding to the known problem symptoms; and
  a microprocessor configured to attempt to determine a target cause of the current problem from among the plurality of potential causes based on attributes associated with the known problem symptoms;
  wherein, in response to an inability to determine the target cause of the current problem, the answer support system is configured to choose as a selected attribute an attribute which is not among the attributes associated with the known problem symptoms, wherein an attribute value of the selected attribute is determined to be most likely to identify the target cause of the current problem from said plurality of potential causes found in the knowledge database, determine the target cause based on the selected attribute, and generate a solution based on the target cause, the answer support system further being configured to determine the selected attribute to be an attribute having maximum information gain which is not among the attributes associated with the known problem symptoms, the maximum information gain being based on an entropy value calculation taking into account positive and negative examples of remaining attributes.

20. The answer support system of claim 19, further comprising:
  wherein the knowledge database is maintained to contain historical data mapping relationships between the problem causes and the stored problem symptoms;
  wherein said attempting to determine the target cause is based on a difference between the historical data for the plurality of potential causes with respect to the known problem symptoms in the knowledge database; and
  wherein the selected attribute is a first selected attribute and the target cause is a first target cause, the answer support system further comprising:
  the microprocessor further being configured to generate and send a question associated with the selected attribute; and
  the network interface further being configured to receive as an answer to the question a new known problem symptom, and using the new known problem symptom as an attribute value for a second selected attribute, wherein a second target cause is based on the second selected attribute.

21. The answer support system of claim 19, further configured to perform activities comprising:
- display a question associated with the selected attribute; and
- the network interface further being configured to receive as an answer to the question a new known problem symptom;
- wherein the determining of the target cause is based on the new known problem symptom received as the answer to the question associated with the selected attribute.

22. The method of claim 1, wherein the maximum information gain is based on the entropy value being calculated as follows:

$$\text{Gain}(A_i) = \text{Entropy}(A_i) - \sum_{v \in remainingAttribute} \frac{|S_v|}{|S|} \text{Entropy}(S_v);$$

wherein Gain ($A_i$) denotes information gain of attribute $A_i$, Entropy ($A_i$) denotes an entropy value of the attribute $A_i$, Entropy ($S_v$) denotes an entropy value of a specific remaining attribute, $|S_v|$ denotes a sum of positive and negative examples of the specific remaining attribute, and $|S|$ denotes a sum of positive and negative examples of all remaining attributes.

23. The computer program product of claim 10, wherein the maximum information gain is based on the entropy value being calculated as follows:

$$\text{Gain}(A_i) = \text{Entropy}(A_i) - \sum_{v \in remainingAttribute} \frac{|S_v|}{|S|} \text{Entropy}(S_v);$$

wherein Gain ($A_i$) denotes information gain of attribute $A_i$, Entropy ($A_i$) denotes an entropy value of the attribute $A_i$, Entropy ($S_v$) denotes an entropy value of a specific remaining attribute, $|S_v|$ denotes a sum of positive and negative examples of the specific remaining attribute, and $|S|$ denotes a sum of positive and negative examples of all remaining attributes.

24. The answer support system of claim 19, wherein the maximum information gain is based on the entropy value being calculated as follows:

$$\text{Gain}(A_i) = \text{Entropy}(A_i) - \sum_{v \in remainingAttribute} \frac{|S_v|}{|S|} \text{Entropy}(S_v);$$

wherein Gain ($A_i$) denotes information gain of attribute $A_i$, Entropy ($A_i$) denotes an entropy value of the attribute $A_i$, Entropy ($S_v$) denotes an entropy value of a specific remaining attribute, $|S_v|$ denotes a sum of positive and negative examples of the specific remaining attribute, and $|S|$ denotes a sum of positive and negative examples of all remaining attributes.

* * * * *